(12) United States Patent
Hall

(10) Patent No.: US 8,368,649 B2
(45) Date of Patent: Feb. 5, 2013

(54) CONTROL SYSTEM FOR USE WITHIN A STERILE ENVIRONMENT

(75) Inventor: Andrew F. Hall, St. Charles, MO (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 602 days.

(21) Appl. No.: 12/550,285

(22) Filed: Aug. 28, 2009

(65) Prior Publication Data

US 2010/0053085 A1 Mar. 4, 2010

Related U.S. Application Data

(60) Provisional application No. 61/093,024, filed on Aug. 29, 2008.

(51) Int. Cl.
*G06F 3/033* (2006.01)
*G06F 3/039* (2006.01)

(52) U.S. Cl. ........................................................ 345/163

(58) Field of Classification Search ........................ None
See application file for complete search history.

(56) References Cited

U.S. PATENT DOCUMENTS

| 6,256,015 | B1 * | 7/2001 | Adler ............................. 345/163 |
| 6,445,378 | B1 * | 9/2002 | Flagg ............................. 345/163 |
| 6,458,331 | B1 * | 10/2002 | Roberts ........................ 422/186.3 |
| 6,747,632 | B2 | 6/2004 | Howard |
| 7,212,109 | B2 | 5/2007 | Morita et al. |
| 2005/0165297 | A1 * | 7/2005 | Anderson et al. ............. 600/410 |
| 2006/0173264 | A1 | 8/2006 | Jansen |
| 2007/0073133 | A1 | 3/2007 | Schoenefeld |
| 2009/0171274 | A1 * | 7/2009 | Harlev et al. ............... 604/95.04 |

FOREIGN PATENT DOCUMENTS

JP 2002007054 A * 1/2002

OTHER PUBLICATIONS

English machine translation of JP 2002-007054, Heihachi Shimono, Electromagnetic Coupling Mouse Device, published Jan. 11, 2002.*
Adder Technology Limited, Adder TS4 Four-port keyboard and mouse switch, Jul. 2007.*
EMR (Electro-Magnetic Resonance) Technology; www.wacom-components.com/english/technology/emr.html, Aug. 2009.
Seal Shield Product Catalog; www.sealshield.com/pdf/catalog-large.pdf, 2006.
Seal Shield Waterproof Laser Mouse; www.sealshield.com/datasheets/ss-mouse.pdf, 2006.

* cited by examiner

*Primary Examiner* — Hoa T Nguyen
*Assistant Examiner* — Mark Fischer
(74) *Attorney, Agent, or Firm* — Alexander J Burke

(57) ABSTRACT

A system for controlling multiple computerized medical devices includes a passive sterile mouse and an active mouse-sensing base for sensing a position of the passive sterile mouse and generating a control signal for controlling at least one computerized medical device. A sterile mouse pad is selectively positioned over the active mouse sensing base for sealing the active mouse-sensing base thereunder. A multiplexer is coupled to the active mouse-sensing base for receiving the control signal and providing the control signal to the at least one computerized medical device enabling control of the at least one computerized medical device, within a sterile field during an interventional procedure.

22 Claims, 12 Drawing Sheets

US 8,368,649 B2

CONTROL SYSTEM FOR USE WITHIN A STERILE ENVIRONMENT

This is a Non-provisional patent application that claims priority from U.S. Provisional Patent Application Ser. No. 61/093,024 filed on Aug. 29, 2008 by Andy Hall.

FIELD OF THE INVENTION

The invention concerns a control device for controlling computerized medical devices and/or systems for use in a sterile environment.

BACKGROUND OF THE INVENTION

The use of computerized medical devices and healthcare information system during evaluation and treatment of a patient is commonplace. Increasingly, computer-based technologies are finding their way into Interventional Radiology and Interventional Cardiology laboratories. This trend will certainly continue. An example includes an electrophysiology laboratory where physicians interact with up to five computer controlled systems, including but not limited to an X-ray System, a Electrocardiogram Recording System, an RF Ablation System, a 3D Mapping System (e.g. Carto) and/or an intra-cardiac ultrasound system. A physician must perform any intervention and/or treatment procedures in a sterile field and is heretofore unable to directly control these computerized medical devices or systems. Rather, the physician must rely on a separate staff member to operate these systems or utilize non-standard control devices such as a joystick or touch screen that is unevenly covered by a sterile drape.

There are drawbacks associated with the current control mechanism typically employed in a sterile environment. Having a staff person dedicated to controlling one or more computer-based systems by listening to the verbal commands of the physician, while effective, is inefficient for controlling these systems. Additionally, the use of a dedicated staff person dramatically increases the cost associated with treatments or interventions which is problematic in the current environment of reduced reimbursements from insurance companies and the overall desire to cut healthcare related costs. Furthermore, the use of non-standard control devices such as joysticks and/or touch screens which are covered by a drape also reduce the precision with which the physician is able to operate the system and these control devices have failed to gain acceptance in the interventional laboratory. Moreover, in order to gain proficiency with these non-standard control devices, a physician must spend a significant amount of time practicing using these devices in order feel comfortable controlling device while performing treatments or interventions on a live patient.

It is possible to position a conventional control device, e.g. a mouse, on a mouse pad near the sterile field and under a sterile drape. However, this arrangement provides a distinct disadvantage because one must ensure that drape is able to move with the mouse without slipping off the pad and exposing the mouse to fluids such as blood that may disrupt proper operation thereof. Also, controlling a mouse positioned beneath the sterile drape results in a compromise in tactile sensation, restricts the movement of the mouse and limits the location where the mouse pad can be placed.

A further drawback associated with the current control systems relates to the advanced display devices with high resolution display screens for displaying images associated with a plurality of different computerized medical devices and/or systems. There are no devices able to operate in a sterile field enabling direct control of these systems which are displayed for view by a physician during an intervention.

Therefore a need exists to provide a control system that utilizes a familiar control interface which provides an intuitive way to directly control a multiple different computerized system to reduce distractions to a physician during an interventional procedure which also reduces overall healthcare related cost of the interventional procedure. A system according to invention principles addresses these deficiencies and related problems.

BRIEF SUMMARY OF THE INVENTION

A system is provided for controlling multiple computerized medical devices. The system includes a passive sterile mouse. An active mouse-sensing base is provided for sensing a position of the passive sterile mouse and generating a control signal for controlling at least one computerized medical device. A sterile mouse pad selectively positioned over the active mouse sensing base for sealing the active mouse-sensing base thereunder. A multiplexer is coupled to the active mouse-sensing base for receiving the control signal and providing the control signal to the at least one computerized medical device enabling control of the at least computerized medical devices, within a sterile field during an interventional procedure.

DETAILED DESCRIPTION OF THE INVENTION

The control system 10 advantageously enables a physician to directly control any of a plurality of different computerized medical devices in a sterile environment, including an interventional laboratory and/or operating room. As used herein, a computerized medical device is any machine or device employed in a healthcare enterprise and used in treating a patient for a particular medical condition. The computerized medical device is selectively operated under the control of a healthcare professional via a user-interface displayed on a display device. A computerized medical device also includes a healthcare information system which is any computerized system connected, either locally or remotely via a network, to a computer system in the sterile environment. A healthcare information system allows a physician to directly enter, request, receive, view and annotate data stored in a repository. An interventional laboratory as used herein is a room or other area within a healthcare enterprise that is sterile and allows a physician to perform internal treatments on a patient at a localized access point. Because these access points for these treatments are small, the interventional laboratory includes computerized imaging devices (e.g. X-Ray systems) that are used in guiding the physician during the treatment. For example, cardiac catheterization is performed in an interventional laboratory wherein the vascular access site is generally the groin of the patient and the physician uses the X-ray imaging system to view the progress of the catheter as it approaches the heart. As these procedures open an access point to the patient, they must be preformed in sterile environments. The control system 10 enables the physician performing these and other procedures, to utilize a familiar mechanism, a computer mouse, for controlling the operation of any computerized medical device and/or system that is required.

Figure 1:
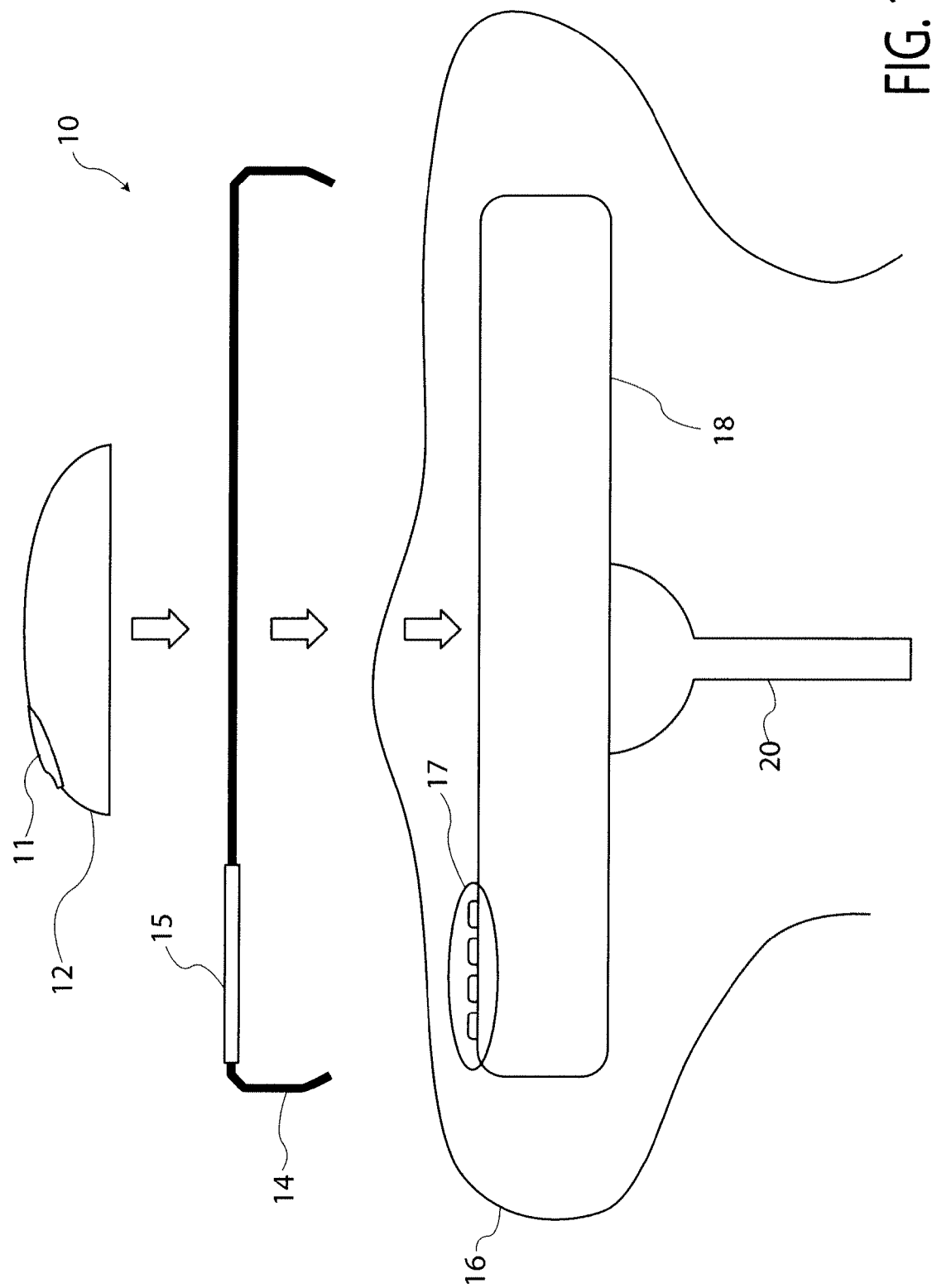
FIG. 1 is an exploded side view of the control system according to invention principles.

Control system 10, as shown in FIG. 1, provides devices that enable a user to directly control a plurality of different computerized device and/or system within a sterile field. In particular, physicians and other healthcare personnel use computerized medical devices in order to treat a patient. The control system 10 provides the physician with a device for controlling a computer that is familiar and intuitive and which enables precise direct control of devices used in delivering treatment to patient. Control system 10 includes a sterile mouse 12, a sterile mouse pad 14 and sensor unit 18.

The sterile mouse 12 includes positional and control circuits sealed entirely within a housing thereof and includes no mechanical or optical parts that are typically used in computer mouse operation. The control circuits and positional circuits contained within the house of the sterile mouse 12 operate in a known manner and are used by the sensor unit to determine a position of the mouse and to control a computerized device to which it is connected. The housing of the sterile mouse 12 prevents any contaminant from contacting the internal circuitry and disrupting normal mouse operation. For example, in an interventional laboratory a physician needs to operate a computer in a sterile field because the area on the patient being treated by the physician results incisions in the skin, exposing blood stream and tissues. In this environment, it is common for patient fluids (blood, plasma, etc) to come into contact with the equipment being used during the intervention. The sterile mouse 12 is impervious to these (and other) patient fluids because the positional and control circuitry is sealed within the housing of the mouse 12. Thus, the sterile mouse advantageously provides the physician with a device for directly controlling the equipment used during the intervention.

The sterile mouse 12 includes at least one user-selectable control button 11 for initiating an action for controlling a particular computerized medical device. The at least one control button 11 is coupled to the control circuit within the housing of the sterile mouse 12. The control circuit receives an activation signal in response to user selection of the at least one control button 11 and transmits the activation signal, as will be discussed below, to the computerized medical device for initiating an action to be taken or performed by the computerized medical device for treating a patient. The at least one control button 11 is formed such that it does not provide access to the interior of the housing of the sterile mouse. Alternatively, the at least one control button may be a touch pad. In a further embodiment, the sterile mouse 12 includes a scroll device enabling the physician to scroll the length of an image displayed on a display device.

The sterile mouse 12 further includes at least one lift positioned on an underside thereof. The at least one lift provides a space between the underside of the mouse 12 and any surface on which the mouse is positioned. The space between the mouse 12 and the surface reduces any friction or other interference associated with any fluid that contacts both the mouse 12 and the surface.

Figure 4:
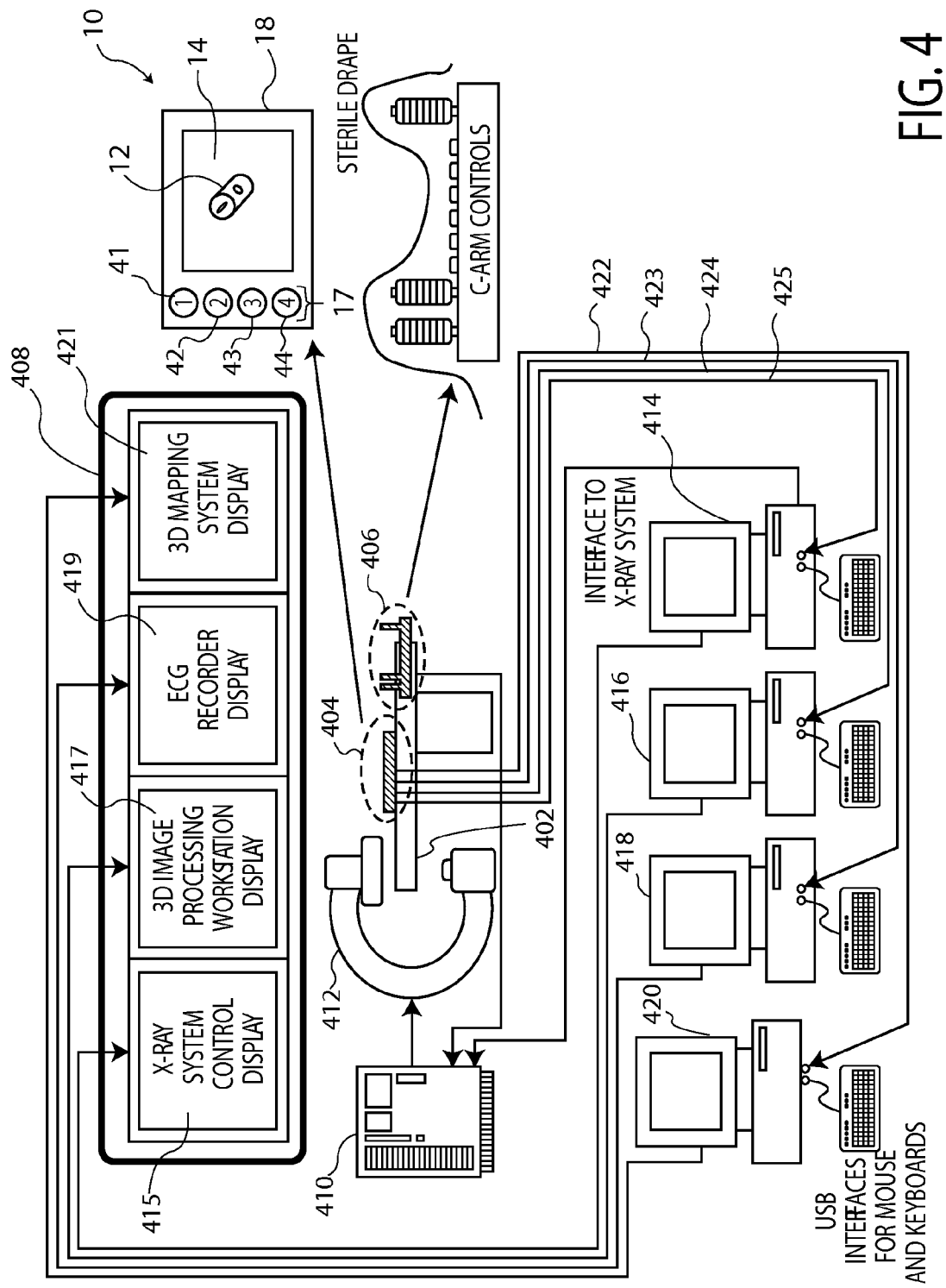
FIG. 4 is a block diagram detailing an exemplary clinical setup in which the control system according to invention principles may be implemented.
Figure 5:
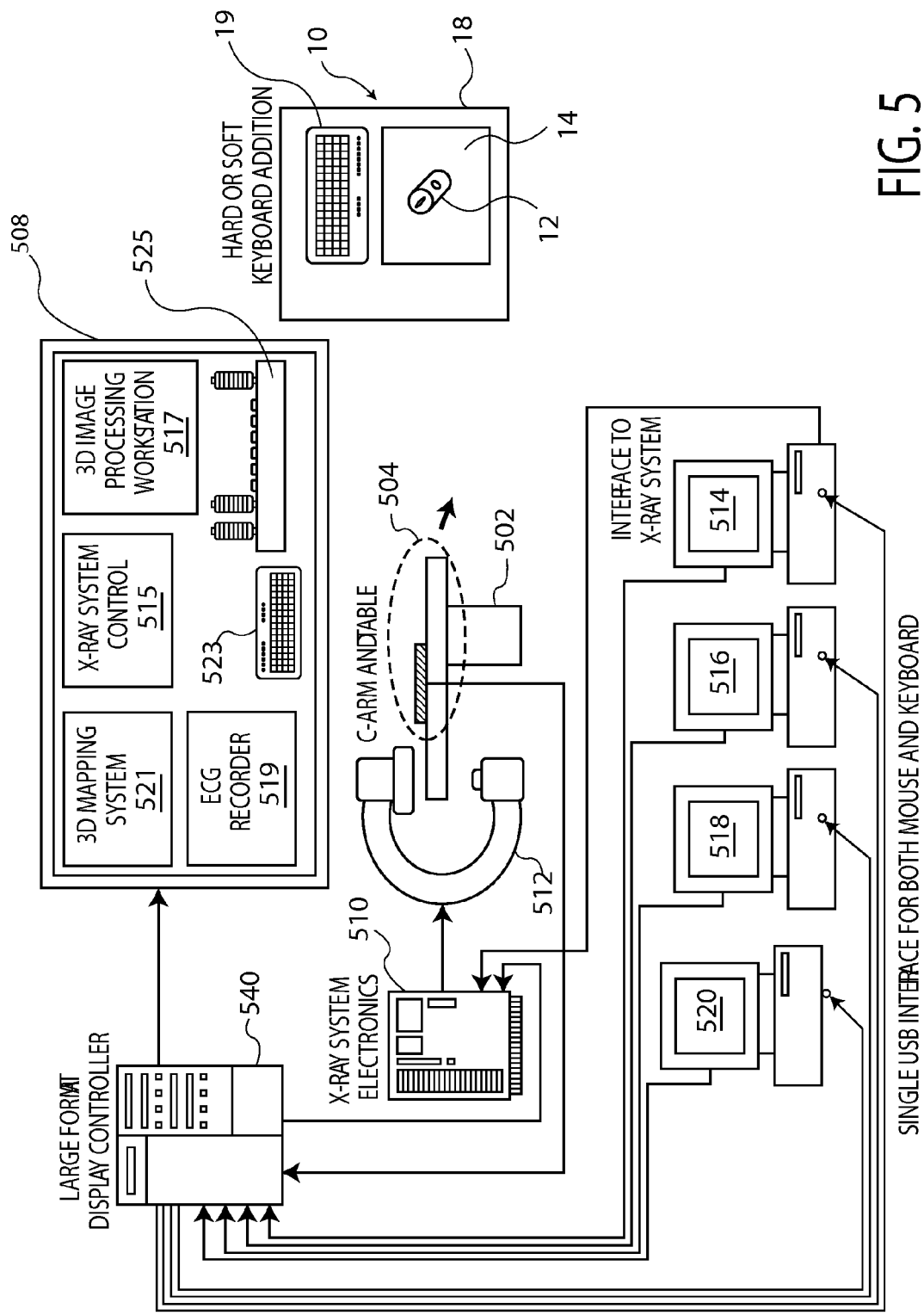
FIG. 5 is a block diagram detailing an exemplary clinical setup in which the control system according to invention principles may be implemented.

The sensor unit 18 is mounted to a surface in a treatment or intervention room via mount 20. The sensor unit 18 includes an array of sensors for sensing a position of the sterile mouse 12. The sensor array in the sensor unit 18 is electrically active and generates energy used by the positional and control circuits of the sterile mouse 12. The sensor unit 18 is coupled to at least one computerized medical device as shown in FIGS. 4 and 5 and enables the user to directly control the computerized medical device. Sensor unit 18 further includes a selection panel 17 including a plurality of user-selectable buttons enabling the user to switch between controlling different computerized medical devices. Exemplary operation of the sensor unit 18 and sterile mouse 12 is discussed with respect to FIG. 3.

The physician depresses the at least one control button 11 in response to viewing the position of the cursor on a display device. When the position corresponds to a user selectable image element for initiating an action to be performed by the computerized medical device, the user depresses the at least one control button 11. In response thereto, the control circuitry in the sterile mouse generates an activation control signal that is transmitted to the sensor pad 18. Upon receipt of the activation control signal, the sensor pad 18 provides the activation control signal to the particular computerized medical device which initiates the desired action.

Because the sensor pad 18 includes the active sensing electronic circuitry for translating a position of the sterile mouse 12 for use in controlling the computerized medical device, the sensor pad 18 is inherently non-sterile because it is a fixed element in a procedure room or intervention laboratory. It is known to place a sterile drape 16 over surfaces that are fixed and not disposable. However, these drapes 16 often distract or interfere with the operating system controls used in treating the patient. This drawback is remedied by the sterile cover 14 which is provided in a shape substantially equal to a shape of the sensor pad 18. The sterile cover 14 is positioned over the sterile drape 16 and sensor pad 20 and seals the sensor pad 18 thereunder. The sterile cover 14 ensures that the sterile drape 16 lays smoothly over the sensor pad 18 and prevents any unwanted interference from the drape 16 while controlling the computerized medical device. The sterile cover 14 also includes an aperture 15 extending therethough a location corresponding to the selection panel 17. The aperture 15 provides access to the plurality of selection buttons 17 that allow the user to actively switch between controlling different computerized medical devices. In an alternate embodiment, the sensor pad 18 includes a keyboard and the sterile cover 14 includes a second aperture corresponding to the location of the keyboard for providing access to the keyboard. An example of this alternate embodiment is shown in FIG. 5. Note that even with the open aperture, the sterile drape is still there covering the sensor pad 18 and selection buttons 17 ensuring that these components remain sterile.

The sterile cover 14 also acts as a mouse pad and provides a smooth, desktop-like surface over which the sterile mouse 12 is moved. The sterile cover 14 is formed from a material that will minimize friction between itself and the sterile mouse and is impervious to bodily fluids. The sterile cover 14 functions as a sterile mouse pad enabling the physician to use the sterile mouse 12 in a familiar manner as it would be used with any conventional desktop computer.

Figure 2:
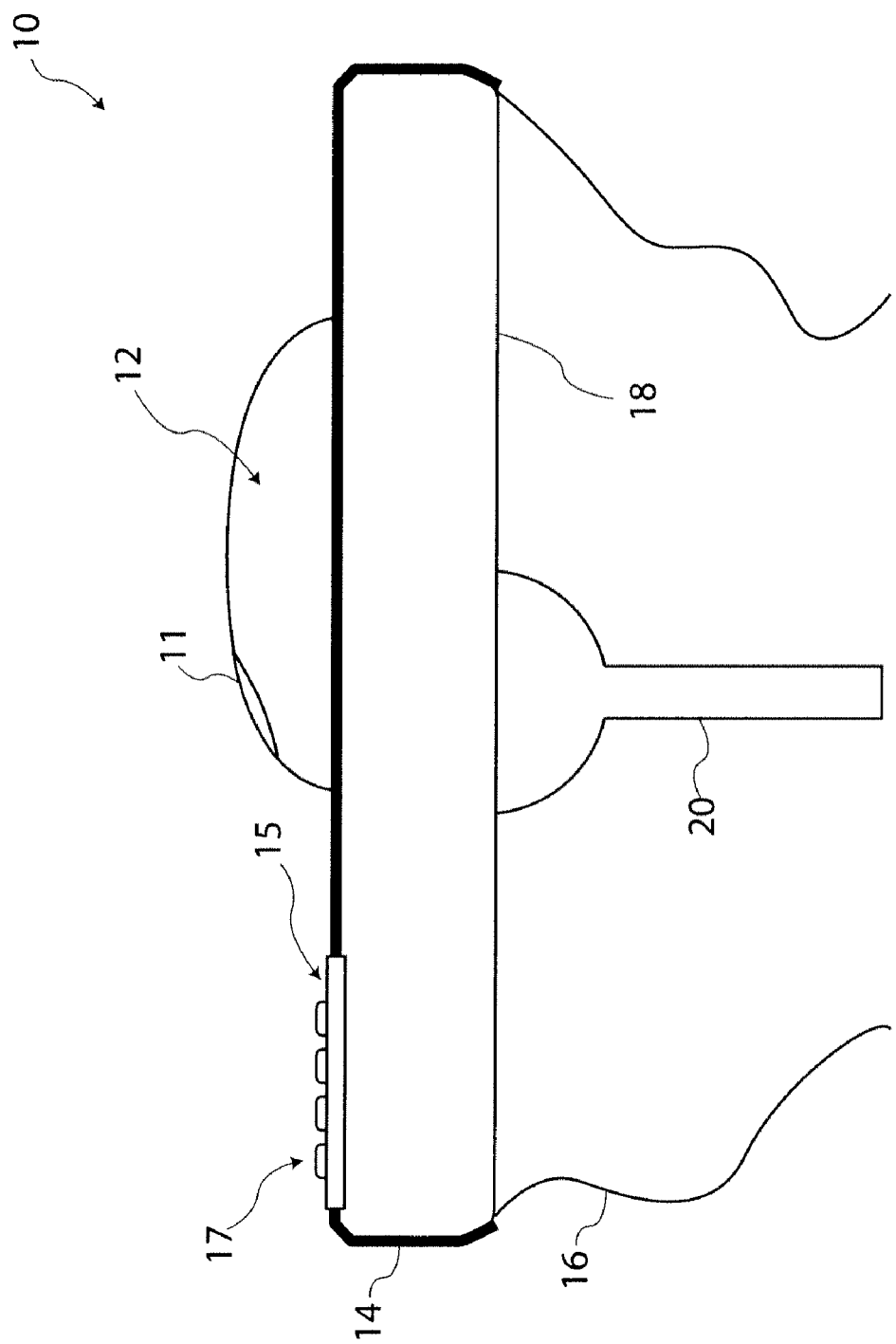
FIG. 2 is a side view of the control system according to invention principles.

The control system 10 is shown assembled in FIG. 2. The sterile cover 14 fits over the sensor pad 18 and stretches the sterile drape 16 over the sensor pad 18 in order to maintain the sterile field. The sterile cover 14 further advantageously keeps the drape 16 out of the way of the physician who is controlling the computerized medical device. Thus, the control system 10 prevents any unwanted interference during patient treatment. When assembled, the control system 10 advantageously provides the physician with a manner for controlling the computerized medical devices that is intuitive and which does not require additional clinical practice to master. The use of a the sterile mouse 12 and sterile cover 14 provides a user control interface that is familiar to all medical personnel able to be employed in conditions where sterility is paramount, for example an operating room or interventional laboratory. When the physician is finished, the sterile mouse 12 and sterile cover 14 are disposed of. Alternatively, the sterile mouse 12 and sterile cover 14 may be re-sterilized using known techniques. Once re-sterilized, the mouse 12 and cover 14 are re-packaged and re-used in a subsequent sterile environment.

Figure 7:
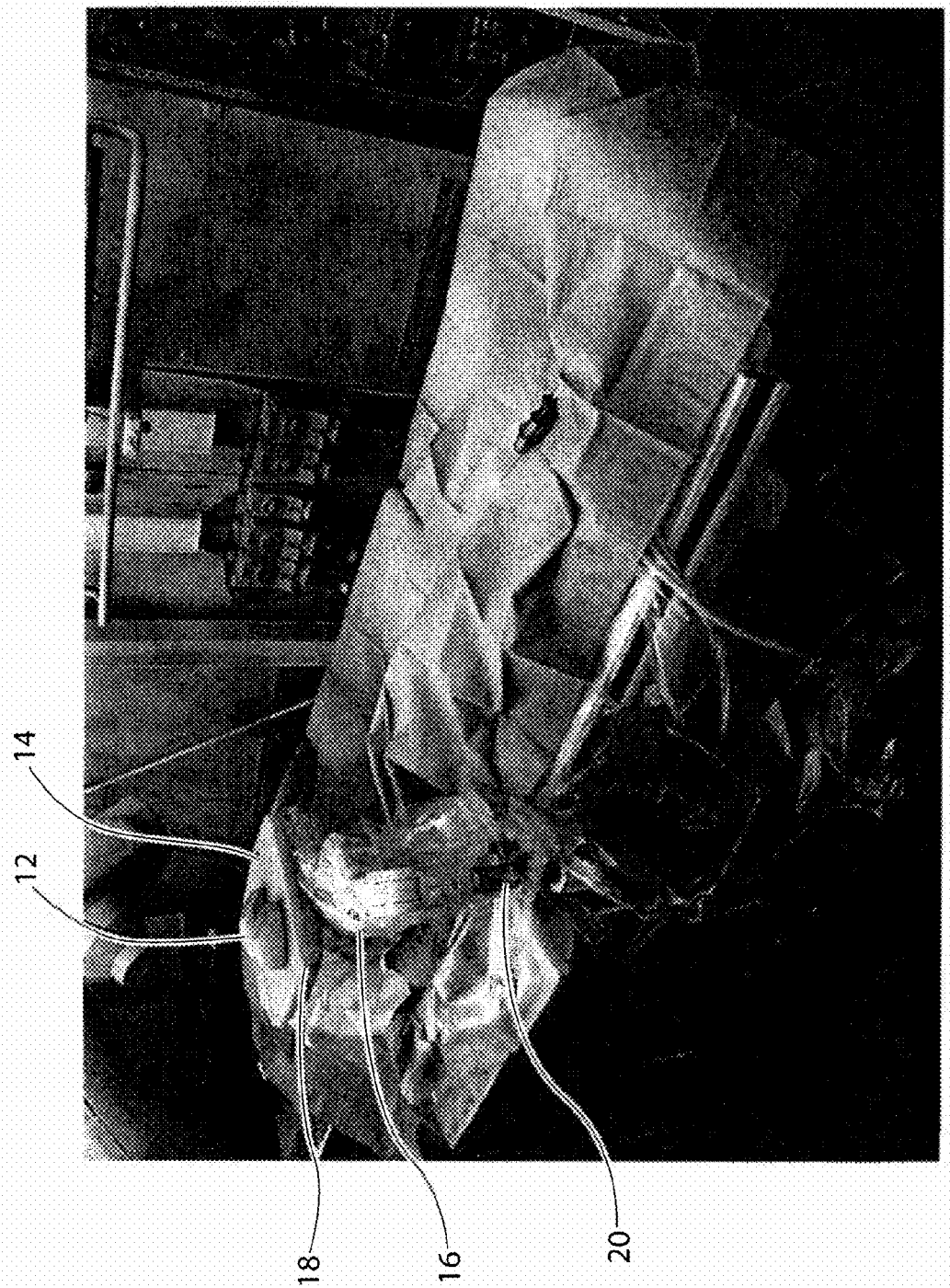
FIG. 7 is an exemplary intervention laboratory including the control system according to invention principles.

The sterile mouse 12 employing passive electronic circuitry for controlling operation thereof advantageously provides a user control interface that is impervious to any fluid (e.g. blood, plasma, etc) because the sterile mouse 12 does not use any mechanical or optical control elements. Thus, the sterile mouse 12 can be positioned close to an access point on a human body receiving treatment. For example, in the instance when a physician is performing a vascular procedure, the sterile mouse 12 may be selectively positioned proximate to the vascular entry site because blood from the entry site would not disrupt operation of the sterile mouse 12 as the blood is unable to penetrate the housing and contact the circuitry contained therein. Any fluid that contacts the sterile cover 14 and/or the mouse 12 is pushed aside by the motion of the mouse 12 and does not interfere with normal mouse operation. An exemplary depiction of an interventional procedure laboratory employing control system 10 is shown in FIG. 7. The mouse-pad interface of the control system does not rely on anything optical or mechanical parts that can be interfered with by blood or other fluids.

While the control system 10 that is described above employs a passive mouse and an active sensing pad, one skilled in the art alternatively could employ an active mouse and a passive sensor pad using electromagnetic tracking technology to sense the position of the mouse. In this embodiment, which is described in FIG. 3D, the active mouse includes electronic circuitry that emits an electromagnetic (EM) signal at a particular frequency. The sensor pad in this embodiment includes at least three coils, preferably more, that receive electromagnetic signal from the mouse. The coils in the sensor pad sense the relative magnitude of the EM signal emitted by the mouse using the at least three coils. The relative magnitudes of the mouse signal sensed by the three coils enables triangulation of the mouse position to generate positional data which is provided to the computer system and which is mapped on a display device in a known manner. The electromagnetic tracking technology operates in both 2D and 3D space. Additionally, in this embodiment, selection of a mouse button changes frequency of transmission of the signal emitted by the mouse but the relative magnitude stays the same. The change in frequency is associated with and causes the system to generate an activation signal and uses the relative magnitude of the signal for data representing the position of the mouse which is continually provided to the computerized medical device being controlled at a given time.

Block diagrams of the control system for controlling multiple computerized medical devices is shown in FIGS. 3A-3D. An executable application, as used herein, comprises code or machine readable instructions for conditioning a processor to implement predetermined functions, such as those of an operating system, a context acquisition system or other information processing system, for example, in response to user command or input. An executable procedure is a segment of code or machine readable instruction, sub-routine, or other distinct section of code or portion of an executable application for performing one or more particular processes. These processes may include receiving input data and/or parameters, performing operations on received input data and/or performing functions in response to received input parameters, and providing resulting output data and/or parameters. A processor as used herein is a device for executing machine-readable instructions stored on a computer readable medium, for performing tasks and may comprise any one or combination of, hardware and firmware. A processor may also comprise memory storing machine-readable instructions executable for performing tasks. A processor acts upon information by manipulating, analyzing, modifying, converting or transmitting information for use by an executable procedure or an information device, and/or by routing the information to an output device. A processor may use or comprise the capabilities of a controller or microprocessor, for example, and is conditioned using executable instructions to perform special purpose functions not performed by a general purpose computer. A processor may be coupled (electrically and/or as comprising executable components) with any other processor enabling interaction and/or communication there-between. A user interface processor or generator is a known element comprising electronic circuitry or software or a combination of both for generating display images or portions thereof. A user interface comprises one or more display images enabling user interaction with a processor or other device.

A user interface (UI), as used herein, comprises one or more display images, generated by a display processor and enabling user interaction with a processor or other device and associated data acquisition and processing functions. The UI also includes an executable procedure or executable application. The executable procedure or executable application conditions the display processor to generate signals representing the UI display images. These signals are supplied to a display device which displays the image for viewing by the user. The executable procedure or executable application further receives signals from user input devices, such as a keyboard, mouse, light pen, touch screen or any other means allowing a user to provide data to a processor. The processor, under control of an executable procedure or executable application manipulates the UI display images in response to the signals received from the input devices. In this way, the user interacts with the display image using the input devices, enabling user interaction with the processor or other device. The functions and process steps herein may be performed automatically or wholly or partially in response to user command. An activity (including a step) performed automatically is performed in response to executable instruction or device operation without user direct initiation of the activity.

The sterile mouse 12 includes passive electronic circuitry 30 used for providing an identification signal to the sensor pad 18 for use in calculating positional data as discussed below. The passive electronic circuitry is also coupled to the at least one control button 11. In response to depressing the at least one control button, passive electronic circuitry generates an activation signal which is further transmitted to the sensor pad 18 for communication with the computerized medical device to initiate an action be performed by the computerized medical device.

The sensor pad includes active sensing electronics 32 coupled to a control processor 34. Power for the active sensing electronics is provided in a known manner, by example, via USB connection connecting the sensor pad 18 to the computerized medical device. In exemplary operation, the passive electronic circuitry 30 of the sterile mouse 12 and active sensor electronic circuitry 32 of sensor pad 18 operate using electromagnetic resonance technology. In this embodiment, the active sensor electronics 32 includes a two dimensional matrix of excitable wire coils. The coils are excited via sequentially in a transmit-then-receive mode. The passive circuitry 30 is a passive resonant circuit that makes use of the energy transmitted from the wire coils in the sensor pad 18 to return a signal that is sensed by the coils. The signal is transmitted at a particular frequency and corresponds to the particular location of the sterile mouse 12 at a given time. In operation, the active sensor electronics discharges alternating current to selected loop coils from among the array installed in the sensor pad 18. This AC current excites the coils in the sensor pad 18 and causes the coils to generate magnetic fields. When the sterile mouse 12 passes through these magnetic fields, the passive resonant circuit 30 in the sterile mouse 12 receives and stores energy in its resonant circuit. The active sensor electronics initially detects a rough location of the sterile mouse by scanning the loop coils on the sensor pad through which the sterile mouse 12 has passed when the coils are in the receive mode. The sensor pad 18 further calculates a refined and more precise location by scanning multiple loop coils in the vicinity of the detected rough location and uses the detected positional information to calculate data representing a precise coordinate of the sterile mouse 12.

The sensor pad 18 further includes a control processor 34 coupled to the active sensor electronics 32 and further coupled to a selection processor 40 of the selection panel 17. The selection processor 40 facilitates selection of the desired computerized medical device and establishes communication between the sensor pad 18 and the selected computerized medical device. For example, the selection processor 40 includes the capabilities of a multiplexer. The selection panel 17 includes device selection buttons 41-44 for selecting a respective one of said plurality of computerized medical devices to be controlled at a particular time. As shown herein, the selection panel 17 includes 4 selection buttons but any number of selection devices corresponding to any number of computerized medical devices may be employed.

A user selects one of button 41-44 and a device identifier corresponding to the selected device is provided to the selection processor 40 for determining which computerized medical device is to be controlled at that particular time. The computerized medical devices controlled by control system 10 are in bidirectional communication with the sensor pad 18. Selection processor 40 automatically establishes a communication channel between the selected device and the control system 10 and the physician is able to visualize on a display device a user-interface corresponding to the selected computerized medical device. Within the user interface, the physician is able to view a cursor that is selectively controlled by the sterile mouse 12.

Upon selection of the device to be controlled, data representing the precise position of the sterile mouse 12 is provided to the control processor 34 for generating a control signal 38 including the positional data. Control processor 38 operates continuously to determine any changes in positional data and any changes are provided in subsequent control signals to the selection processor which facilitates communication between the sensor pad 18 and the computerized medical device. In response to activation of the at least one control button 11 on the sterile mouse 12, the activation signal is provided to the control processor 34 which generates further control signals that include positional data and data representing the activation signal to be provided to the computerized medical device via the selection processor 40. Upon receipt, the computerized medical device translates the activation signal to, for example, select an image element on the display device that initiates a particular action to be performed by the computerized medical device.

Figure 3A:
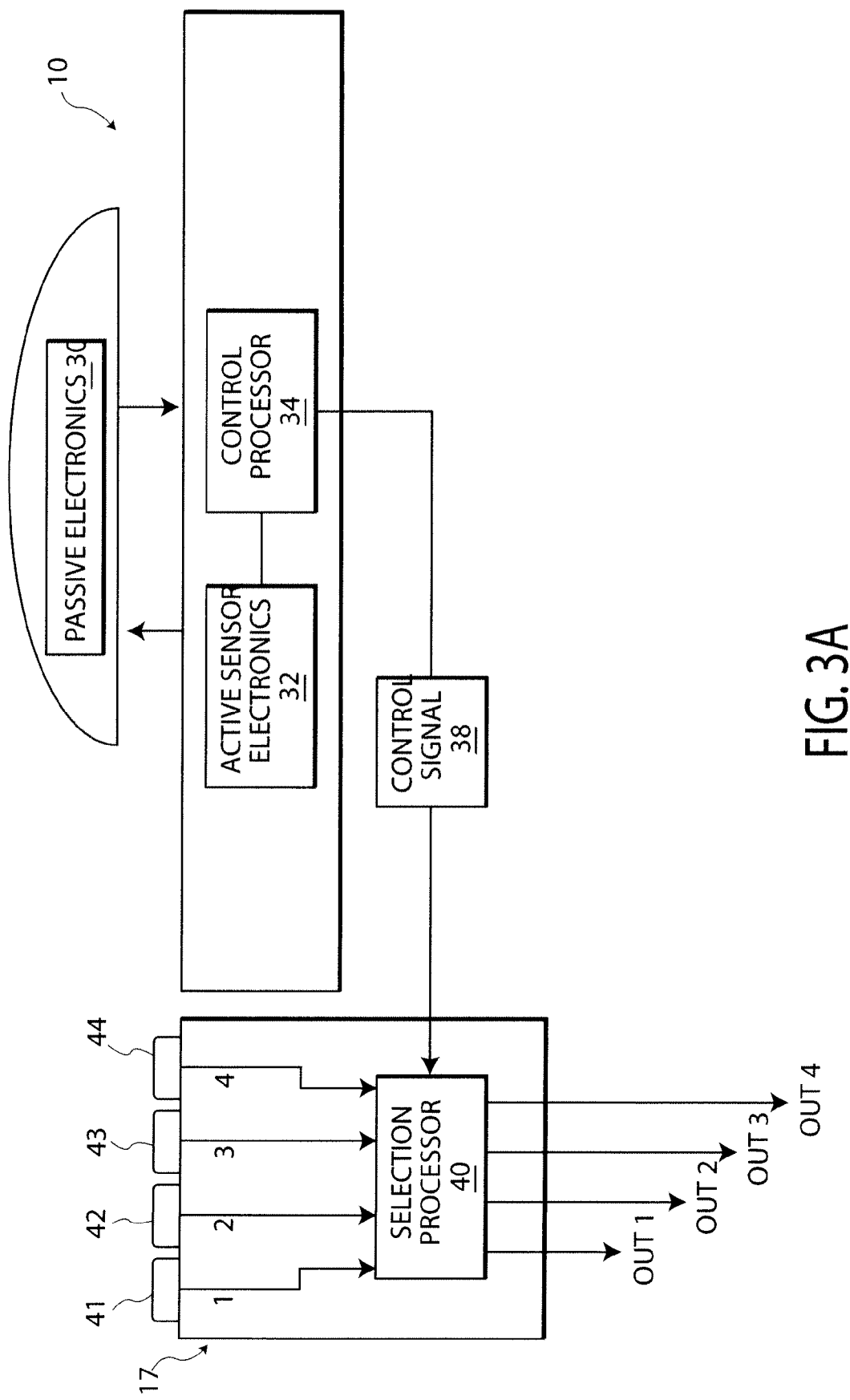
FIGS. 3A-3D are block diagrams of the control system according to invention principles.
Figure 3B:
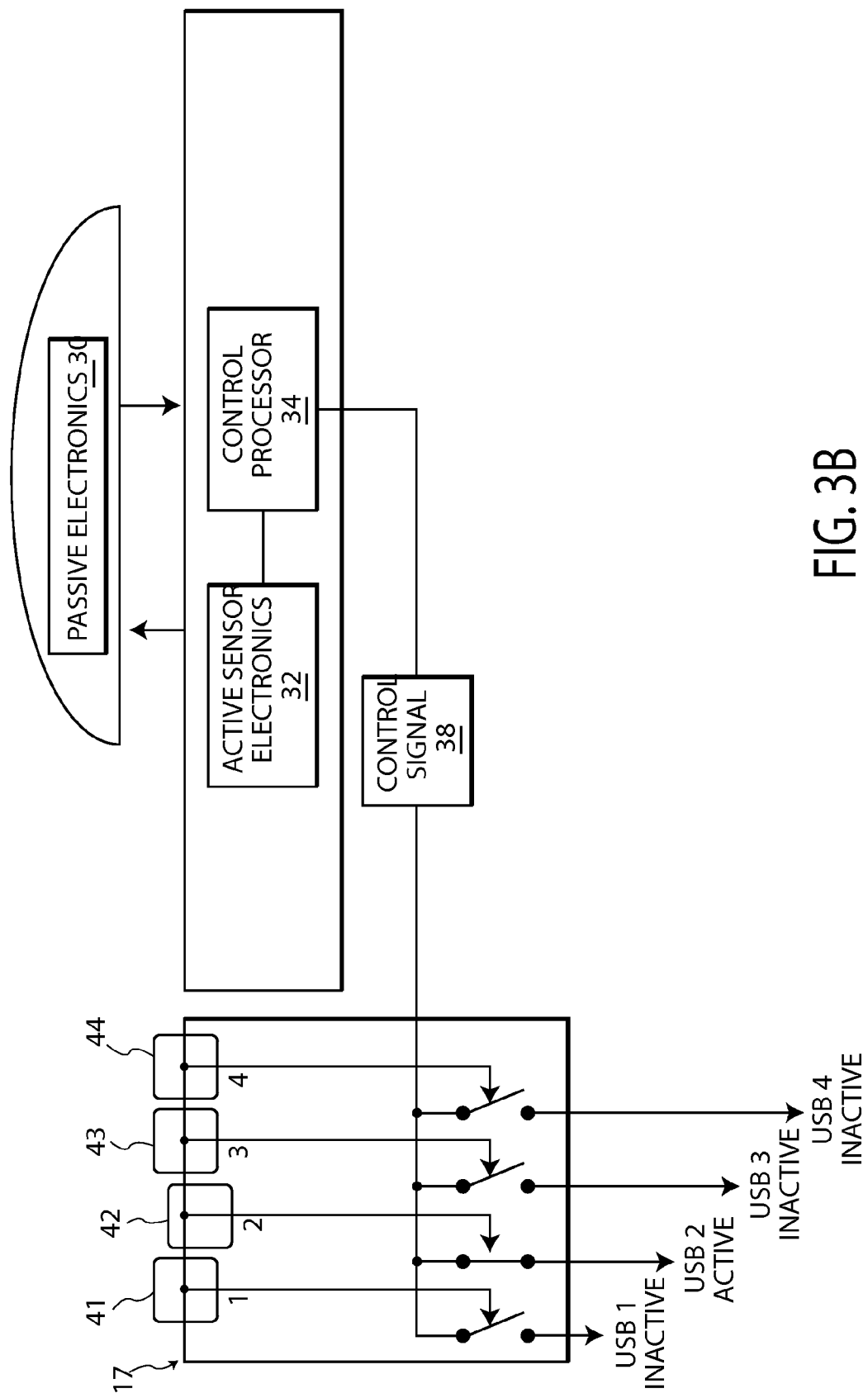
Figure 3C:
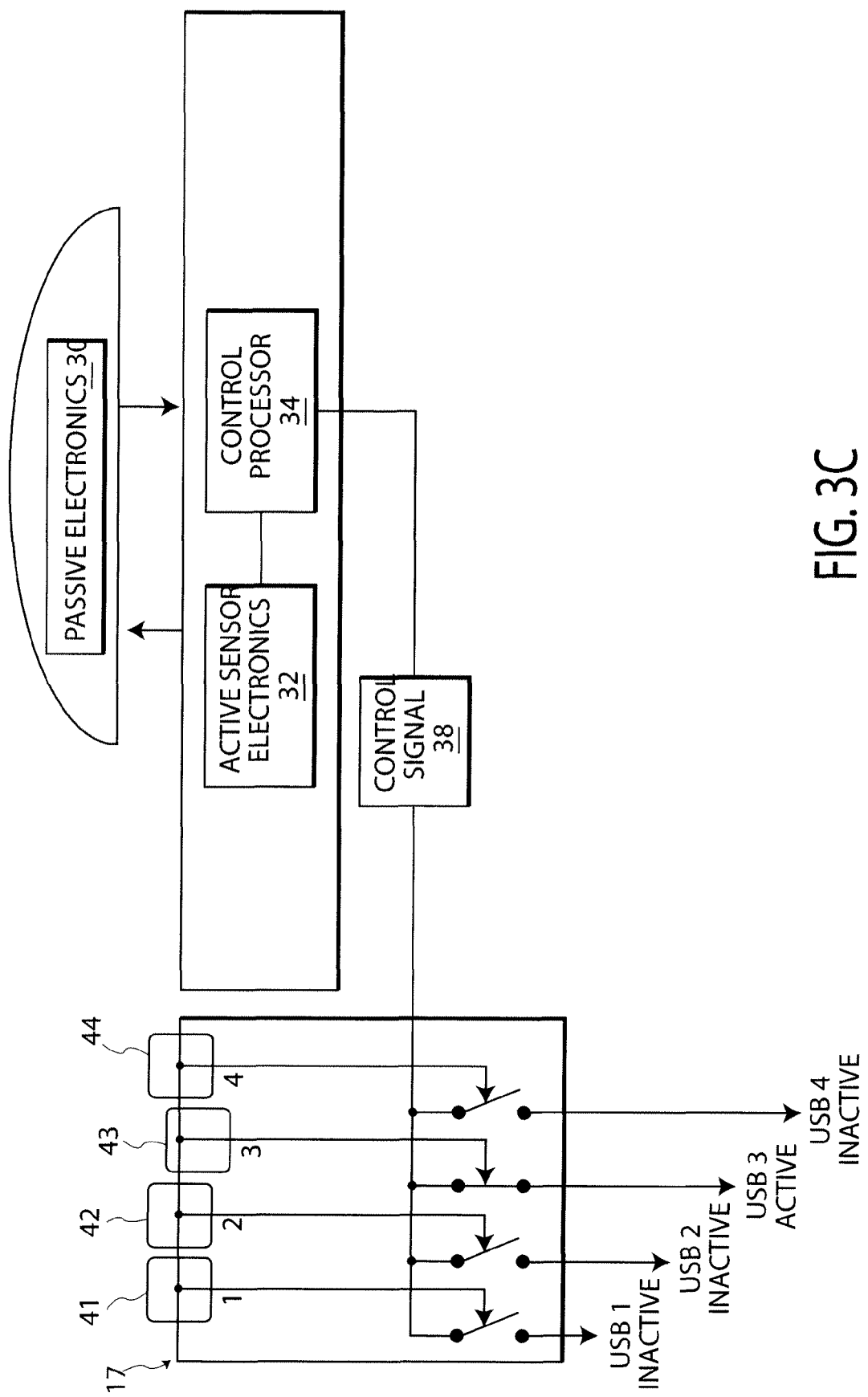

FIGS. 3B and 3C are block diagrams detailing exemplary operation of the selection processor 40 of FIG. 3A. In these embodiments, the selection processor 40 is a switch. The operation and circuitry are the same as those in FIG. 3A. The system 10 includes four switches corresponding to each of the selection buttons 41-44. Each switch includes a toggle moveable between a open position and a closed position. In FIG. 3B, selection switch 42 is depressed and the corresponding toggle is in a closed position which completes a circuit between a USB output port and the sensor pad 18 enabling communication of the control signal 38 from the sensor pad 18 to the computerized medical device that is connected to the active USB port. When a respective toggle is in a closed position, all other toggles corresponding to the remaining selection buttons are caused to be in an open position. This ensures that only a single computerized medical device is being controlled at a given time. When the physician needs to switch the computerized medical device being controlled, selection button 43 is depressed causing the corresponding toggle to move into the closed position completing the corresponding circuit and enabling communication of the subsequent control signals to the device connected to the now active USB port labeled USB3. The remaining toggles are caused to be in an open position by the selection of selection button 43. While the output ports described in FIGS. 3B and 3C are USB ports, the output ports may be any known communication interface employing any communication protocol.

Figure 3D:
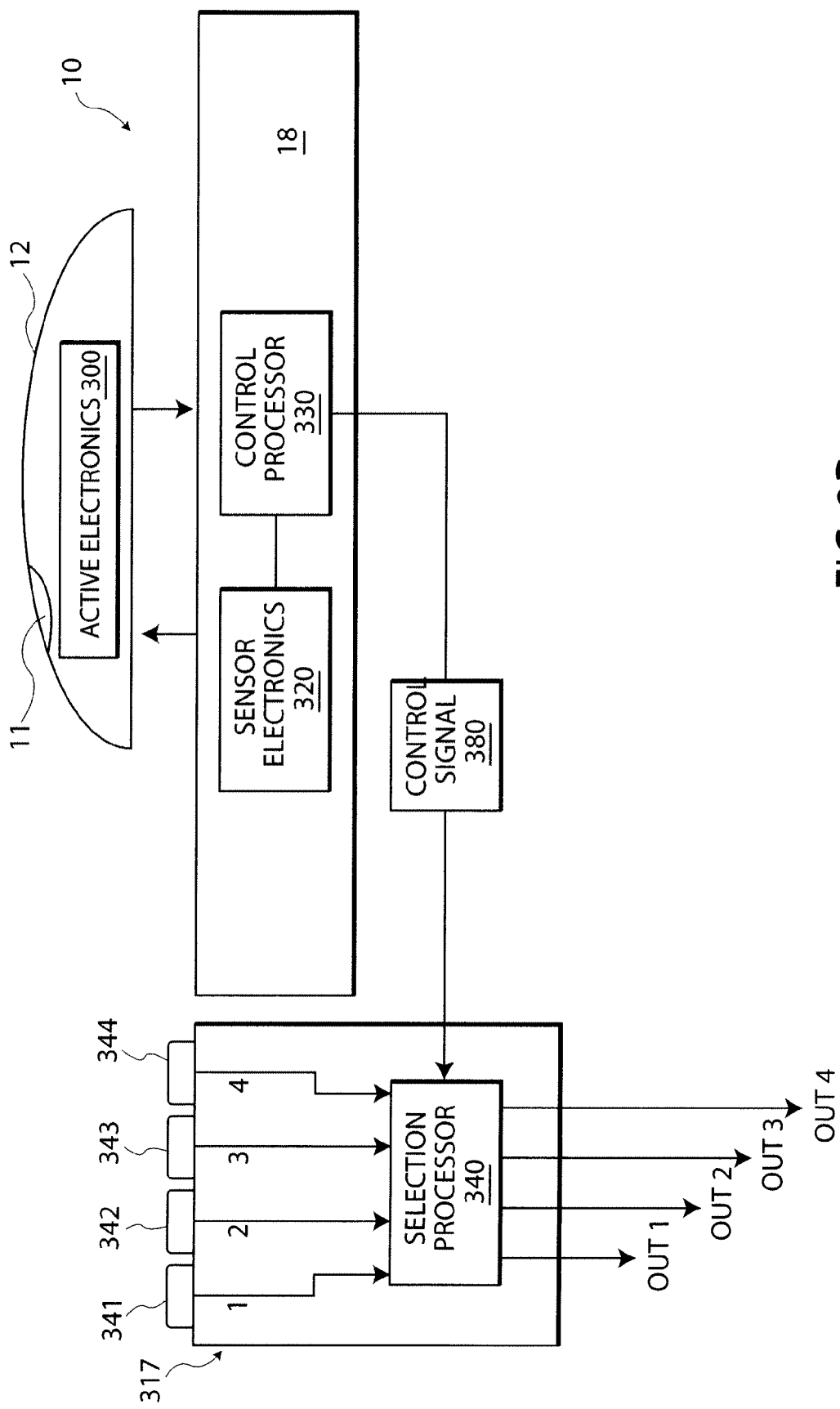

FIG. 3D is an exemplary block diagram of the control system whereby the sterile mouse 12 includes active electronics 300 for generating a signal and the sensor pad 18 includes sensor electronics 320 conditioned for sensing a relative magnitude of the signal emitted by the mouse 12. The active electronics 320 are powered by a power source in the sterile mouse 12. The active electronics generate an electromagnetic signal at a first frequency which is emitted at continuous intervals. The sensor electronics 320 include at least three wire coils, preferably more, that receive electromagnetic signal from the mouse. The wire coils are arranged triangularly within the sensor pad 18. The wires coils in the sensor pad 18 sense a relative magnitude of the EM signal emitted by the sterile mouse 12 using the at least three wire coils. The relative magnitudes of the mouse signal sensed by the three coils enables the control processor 330 to triangulate the mouse position to generate data representing mouse position at a given time. The control processor 330 generates a control signal 380 including the positional data and provides the control signal 380 to the selection processor 340 which has established the connection between the sensor pad and the desired computerized medical device. The control signal 380 is communicated to the computerized medical device and maps a cursor position on the display device in a known manner. The physician selectively actuates control button 11 to initiate an action to be performed by the computerized medical device. Upon depressing control button 11, the active electronics 300 modifies the frequency of the EM signal being emitted thereby. The sensor electronics 320 selectively detects the change in frequency and the control processor 330 generates an activation signal to be coupled with the positional data in control signal 380 to cause the computerized medical device to perform a certain action, for example, selecting an image element on a display screen that initiates a task to be performed. The change in frequency is associated with and causes the system to generate an activation signal and uses the relative magnitude of the signal for data representing the position of the mouse which is continually provided to the computerized medical device being controlled at a given time.

The operation of control system 10 is described in FIGS. 4-9. In a conventional laboratory including an X-ray system, the laboratory includes the following components:

X-ray System Control Computer
X-ray System Electronics
C-arm
Patient Table
C-arm Controls
X-ray System Control Touch Panel The X-ray system has two user interface functions. The first is a software interface to control the parameters of the imaging system (e.g. patient name, X-ray dose to be applied, number of x-ray frames captures per second). There are two ways to accomplish this type of control. The first is via the X-ray system control computer usually located in the control room and outside the sterile field which is controlled by a staff member other than the physician. The second is the X-Ray system control touch panel (usually attached to the patient table). A second user interface function provides for control over the C-arm control. This user interface includes an array of joysticks and buttons to control the mechanical movements of the C-arm, including angulation, translation, collimation, and zoom. All three of these user interfaces (X-ray Control Computer, C-arm Controls, Touch Panel) are connected to the X-ray System Electronics, which carries out the commands.

In addition to the X-ray system, there are one or more other medical computer systems, such as a 3D mapping system (e.g. Biosense Webster's Carto system, St. Jude's Nav-X system), an ECG recording system (e.g. Siemens' Sensis, GE's CardioLab), and a 3D image processing workstation (e.g. Siemens' syngo X-workplace). Each of these systems has its own independent (keyboard and mouse) computer use interface that are controlled from outside the sterile field. These separate computer systems include a slave monitor which is mounted on the opposite side of the patient table from the physician, for physician viewing. The x-ray system and each of the medical computers are operated under the instruction of the physician who is performing the interventional procedure. Currently, the only thing the physician is able to control directly, while still scrubbed (sterile), is the C-arm control and the X-ray control system touch panel, through the sterile plastic drape.

FIG. 4 is an exemplary interventional procedure laboratory that employs the control system 10 which remedies the drawbacks of the conventional interventional laboratory discussed above. The control system 10 replaces the Touch Pad with a sterilized mouse and mouse pad cover placed over the sterile drape, onto the sensor pad. This advantageously allows the physician, while still scrubbed (sterile), to operate the X-ray system control computer, and any other medical computer in the lab. The push button switches on the mouse pad switch between the medical computers. The control system 10 advantageously enables the physician to control approximately 90% of the computer operations because they are mouse driven. These operations can then be performed by the physician with no other personnel present thus reducing the overall cost of providing healthcare to a patient.

The lab includes a patient support table 402 including the control system 10 in the circle labeled 404 and conventional C-arm control mechanism in the circle labeled 406. The control system 10 includes the elements discussed above with respect to FIGS. 1-3 and provides a familiar user control interface for controlling multiple computerized devices. The conventional controls 406 must be draped, as shown, in order to maintain the sterility of the environment and provide a more cumbersome, less intuitive manner of controlling a medical device.

The illustration in FIG. 4 includes an X-ray system electronics 410 for controlling a conventional x-ray imaging system mounted on a C-arm 412. The X-ray machine 410 is operable using an X-ray interface generated by a first computerized medical device 414 which is coupled to a first display 415 that displays the UI generated by computer 414. A second computerized medical device 416 corresponding to a 3D image processing workstation is provided and the processed 3D Images are provided on a second display 417. A third computerized medical device 418 corresponding to an ECG recorder is provided and data acquired from the ECG recorder is displayed on the third display 419. A fourth computerized medical device 420 corresponding to 3D mapping system is provided and mapped data is displayed on the fourth display 421. The display devices 415, 417, 419 and 421 are supported by a display rack mount 408 positioned in a comfortable viewing position for the physician.

The sensor pad 18 (FIG. 3) is coupled to the computerized medical devices 414, 416, 418 and 420 by respective communication channels 422-425, respectively. Upon selecting the selection button 41-44 that corresponds to the desired computerized medical device 414, 416, 418 and 420, the selection processor 40 automatically establishes communication between the control system 10 and the selected device. A cursor appears on the display device associated with the selected computerized medical device and the physician is able to control the device using the sterile mouse 12 (FIG. 3) over the surface of the sterile cover (14). When the physician needs to use a different device, the physician selects the corresponding selection button (41-44) on selection panel 17 of sensor pad 18. The selection processor 40 (FIG. 3) automatically establishes a new connection with the selected device and the current position of the sterile mouse 12 is determined and mapped to a position on the display device that corresponds to the selected computerized medical device.

For example, if a physician needs to initiate an X-ray exam of a patient, the physician depresses selection button 41 causing the selection processor 40 to automatically establish a connection between the sensor pad 18 via communication channel 425. The control system 10 is able to control the user interface of the X-ray machine 410 via computer 414. The physician can initiate an X-ray by maneuvering the mouse 12 within the sterile field and irrespective of any bodily fluids to position a cursor over user-selectable image element and activating the image element using the at least one control button 11 on the sterile mouse 12. At a desired time, the physician might need to manipulate the processed 3D X-ray image. At this point, the physician selects button 42 on the selection panel 17 which causes the selection processor 40 to automatically establish communication between the sensor pad 18 and the second device 416 via communication channel 424. When connected, the positional data corresponding to the position of the sterile mouse 12 is sensed by the sensor pad 18 is provided via communication channel 424 to device 416. This data is mapped to a point on display 417 and cursor is shown at that position. The physician is then able to directly control the 3D Image Processing system 416 without the need to rely on a separate staff member to manipulate an image in the desired manner. Thus, the control system provides more efficient healthcare to the patient at a reduced cost because additional team members are no longer needed to perform actions that are now able to be controlled directly by the physician.

An interventional procedure laboratory employing an alternate embodiment of the control system 10 is shown in FIG. 5. The laboratory depicted in FIG. 5 includes the same exemplary computerized medical devices as described in FIG. 4. As shown herein, the control processor 540 is further conditioned to operate as a large format display controller for generating a composite display images including a plurality of user-definable display areas for display on a large high resolution display monitor 508. The control processor 40 enables the user to define independent display areas in the composite display image for displaying an image corresponding to a respective one of the plurality of computerized medical devices in the laboratory.

The sterile mouse 12, sterile cover 14 and sensor pad 18 operate as discussed above with respect to FIGS. 1-3. While described above as being part of the sensor pad 18, one skilled in the art will recognize that the control processor 40 can be external from and coupled to the sensor pad 18 via a communication channel as shown herein. The control processor 540 is conditioned to operate, at least in part as a large format display controller to define the size and layout of the plurality of display areas to be displayed on composite display 508. The definition of size and layout occurs in response to user command or automatically in response to a predetermined image display template for defining positions of the display areas. The image display template is at least one of based on a use of the laboratory and based on the computerized medical devices employed in the laboratory at a given time. The image display template further includes boundary data defining display area boundaries that enables the control processor 540 to determine when a cursor has moved between different display areas.

The control processor 540 conditions the display to include five independent display areas 515, 517, 519, 521, 523 and 525 for display images associated with different computerized medical devices. In this exemplary laboratory, the computerized medical devices include (a) an interface system 514 for controlling an X-ray machine 510 mounted on a C-arm 512; (b) a 3D image processing workstation 516; (c) an ECG recorder 518 and (d) a 3D mapping system 520. Each of these computerized medical devices is coupled to the control processor 540 and generates data representing images to be displayed in a respective one of the plurality of display areas 515, 517, 519 and 521.

In this embodiment, the position data sensed by sensor pad 18 is applied to the entire composite display area and thus is able to automatically move a cursor through the respective individual display areas that correspond to different computerized medical devices. The active sensing electronics in the sensor pad 18 continually update position data for the sterile mouse and actively and continually identify which display area is being accessed by the physician. Upon determining that the cursor of the mouse has been moved from a first display area to a second different display area, the control processor automatically establishes control over the computerized medical device based on the position of the cursor in response to physician movement of the mouse. For example, if the initial step in treating a patient is to acquire an X-ray image, the physician moves the sterile mouse 12 over the sterile cover 14 such that the cursor on the display is positioned within display area 515 which corresponds to the UI for controlling the X-Ray Machine 510. When the image has been acquired, the next step in treating a patient may include manipulating the image so as to obtain a better view prior to performing a further invasive intervention. Thus, the physician moves the sterile mouse 12 over the sterile cover 14 despite the presence of blood and other bodily fluids on the sterile cover. The sensor pad 18 accurately senses and determines position data for the mouse and allows the cursor to move from display area 515 to a second different display area 517 that includes display images corresponding to the UI for the 3D Image processing workstation. The control processor 540 uses the boundary data associated with display area to determine that a different display area has been entered and automatically switches the computerized medical device being actively controlled by the physician based on the current position of the cursor within the composite display 508.

While the control system is used to operate and control a plurality of computerized medical devices, one skilled in the art would readily adapt the control processor 40 to be conditioned to connect and communicate with individual information systems that make up a healthcare or other enterprise information system. For example, a patient record system may be selectively accessed by the physician during an interventional procedure in order to acquire and view patient medical records and tests. Thus, control processor 40 may automatically assign a display area to display a user interface for accessing a patient record system. Alternatively, the control processor automatically redefines the arrangement of display areas within composite display 508. The automatic redefinition by the control processor 40 includes at least one of increasing, decreasing or resizing of independent display areas for viewing different information systems or medical devices as required for patient care.

The sensor pad 18 of control system 10 further includes a keyboard 19 that is sealed under a drape and the sterile cover that is coupled to control processor 40 and enables the physician to input text-based data for use in controlling or otherwise operating a computerized medical device or information system (e.g. patient record system). This advantageously provides a single point for controlling the plurality of devices and/or systems using a single mouse and keyboard all within a sterile environment. This reduces the chance of errors in patient records because the physician is able to annotate and comment as needed while still in the sterile environment without needing to rely on a separate staff member to enter data. Also, the sterile cover 14 over keyboard 19 will allow the data to be directly entered despite the presence of blood or other bodily fluid as the keyboard is sealed and protected from the fluids in the environment.

In a further embodiment, control processor 40 is conditioned to generate a display image corresponding to a keyboard in display area 523 and a standard X-Ray control device in display area 525. This allows the physician to enter data by selecting image elements representing keys of keyboard to enter data into a patient record, for example, or manipulating image elements representing a joystick to control a the X-Ray machine, for example.

Figure 6A:
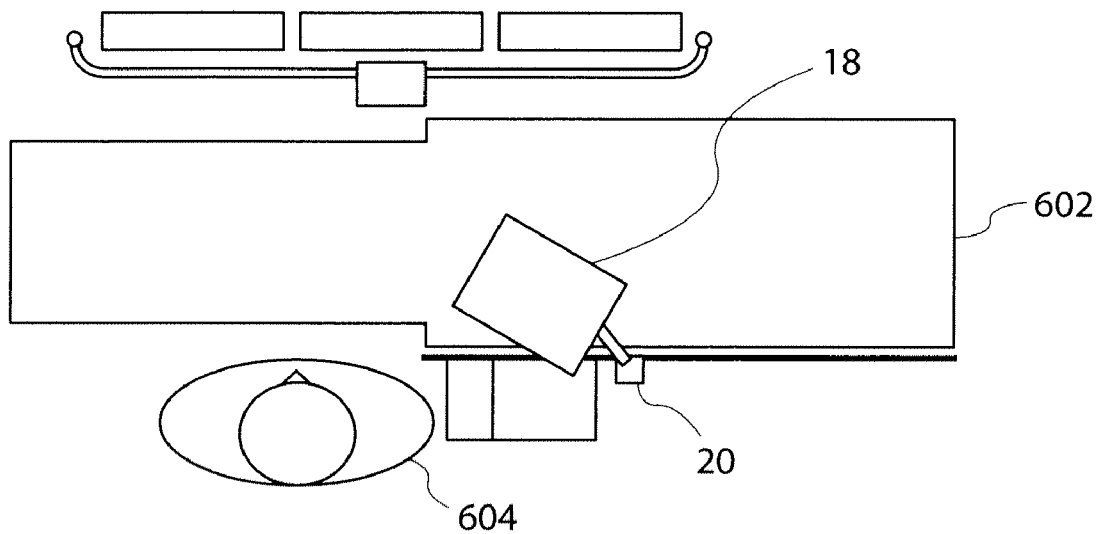
FIGS. 6A & 6B are top views of an exemplary clinical setup in which the control system according to invention principles may be implemented.
Figure 6B:
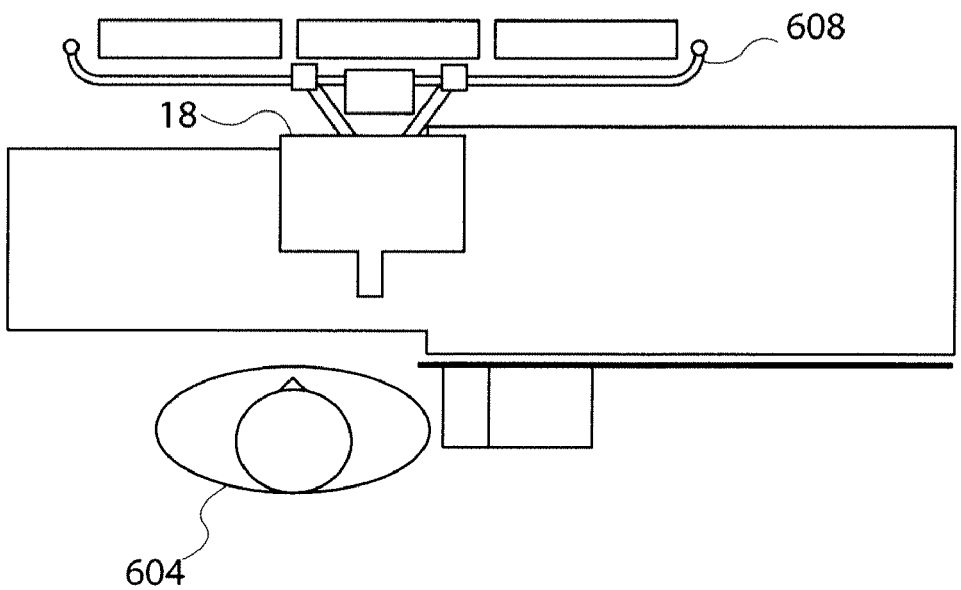

FIGS. 6A and 6B illustrate exemplary positioning of the sensor pad 18 within an interventional procedure room. In FIG. 6A, the sensor pad 18 is mounted via mount 20 to a patient support table 602. The mount 20 enables the sensor pad to be rotated laterally 360 degrees to allow the physician to position the sensor pad 18 at any desired position in close proximity of the patient. The sterile cover 14 and sterile mouse 12 ensure that, despite any contact with fluids from the patient, the physician 604 is able to control the computerized medical device. In FIG. 6B an alternate mounting is shown for the sensor pad 18 of the control system. Sensor pad 18 is mounted to a rack mount 608 used to mount display monitors. In this arrangement, the physician 604 is able to move the display monitors and the sensor pad 18 used to interact with the images on the display monitors together over the length of the patient support table 602.

FIG. 7 is an exemplary interventional procedure room including the control system 10 in accordance with the mounting described hereinabove with respect to FIG. 6A. The sensor pad 18 and the mount 20 is covered by the sterile drape. The sterile cover 14 is positioned over the sensor pad 18 and seals the electronics therefrom from coming into contact with bodily fluids while in the sterile field. A sterile drape is positioned over the sensor pad 18 and the sterile cover smoothes out the sterile drape under the cover 14. The sterile mouse 12 is moveable over the sterile cover 14 and allows the physician to have complete control of every piece of computerized medical equipment in the laboratory from within the sterile field, with no additional personnel and without leaving the sterile field, using the same user interface as a standard desktop computer.

Figure 8:
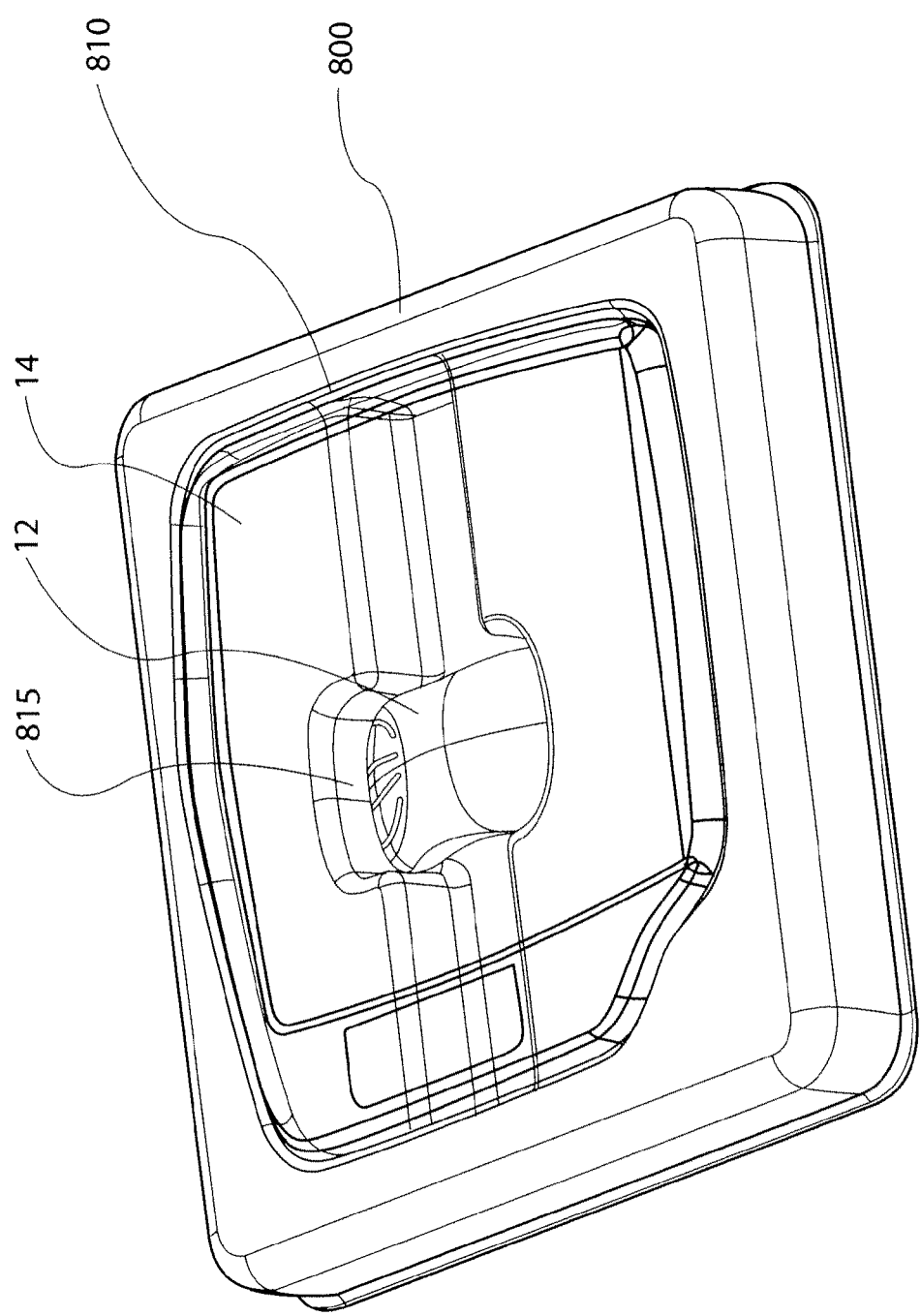
FIG. 8 is a perspective view of the sterile mouse and sterile cover of the control system according to invention principles.

FIG. 8 is a perspective view of an exemplary packaging in which the sterile mouse 12 and sterile cover 14 are provided to a healthcare professional. The packaging material 800 includes a first recessed channel 815 having dimensions able to receive and retain the sterile mouse 12 in a stationary position. A second recessed channel 810 having a depth less than a depth of the first recessed channel 815 and having dimensions able to retain the sterile cover 14. The cover 14, when received by the second recessed channel 810 is positioned to cover the sterile mouse 12 within the first recessed channel 815. In order to maintain the sterility of the mouse 12 and cover 14, the packaging 800 including the sterile mouse 12 and sterile cover 14 is sealed to prevent any contact with the environment, for example in a sealed plastic bag.

Figure 9:
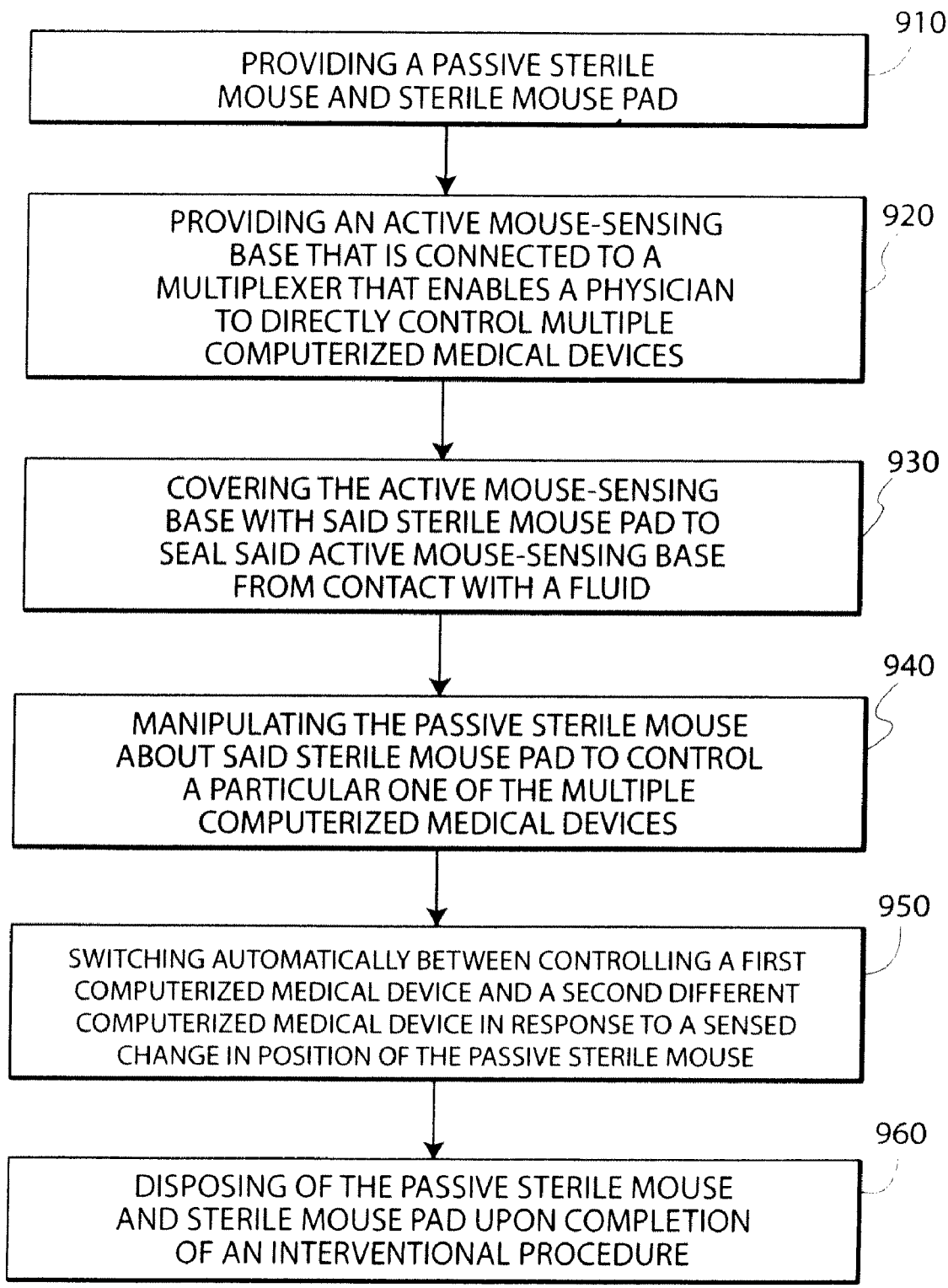
FIG. 9 is a flow diagram detailing operation of the control system according to invention principles.

FIG. 9 is a flow diagram detailing the operation of the control system 10. In step 910, a passive sterile mouse and sterile mouse pad are provided. For example, the sterile mouse and sterile mouse pad may be provided in a single use sterile packaging arrangement. In step 920, an active mouse sensing base that is connected to a multiplexer enables a physician to directly control providing a passive sterile mouse and sterile mouse pad. In step 930, the active mouse-sensing base is covered with the sterile mouse pad to seal the active mouse-sensing base from contact with a fluid and the passive sterile mouse is manipulated about the sterile mouse pad to control a particular one of the multiple computerized medical devices in step 940. A physician is able to automatically switch between controlling a first computerized medical device and a second different computerized medical device in response to a sensed change in position of the passive sterile mouse in step 950 and, upon completion of an interventional procedure, the passive sterile mouse and sterile mouse pad is disposed of in step 960.

As described above with respect to FIGS. 1-9, a system is provided for controlling multiple computerized medical devices. The system includes a passive sterile mouse including at least one control button and an active mouse-sensing base for sensing a position of the passive sterile mouse and for generating a control signal for controlling at least one computerized medical device. The passive sterile mouse includes a resonant circuit selectively activated by a magnetic field generated by the active mouse-sensing base.

A sterile mouse pad is selectively positioned over the active mouse sensing base for sealing under a drape the active mouse-sensing base thereunder. A multiplexer is coupled to the active mouse-sensing base for receiving the control signal and providing the control signal to the at least one computerized medical device enabling control of the at least computerized medical devices, within a sterile field during an interventional procedure. The active mouse sensing-base includes a plurality of control buttons coupled to the multiplexer for selecting a particular computerized medical device to be controlled by the passive sterile mouse and the active mouse-sensing base senses a position of the passive sterile mouse and automatically assigns at least one control function associated with a particular computerized medical device to the at least one control button. The system further includes at least one display device for displaying an image corresponding to a particular computerized medical device being controlled by the passive sterile mouse.

In an alternate embodiment, a system for controlling a healthcare information technology system in a sterile environment is provided. The system includes a sterile mouse including at least one user activated control button and includes a resonant circuit sealed therein. A sensor pad includes circuitry for generating a magnetic field and activating the resonant circuit in the sterile mouse to sense a position of the sterile mouse and including at least one output port for selectively enabling control of at least one healthcare computer system using the sterile mouse. A sterile cover is selectively positioned over the sensor pad for sealing the sensor pad under the sterile cover, the sterile cover enabling natural movement of the sterile mouse by a user for controlling the at least one healthcare computer system.

A sterile drape is provided for covering the sensor pad and sterile cover is removably positioned over the sterile drape and sensor pad further sealing the sensor pad from contact with any bodily fluids within a sterile field. The sterile mouse includes at least one lift positioned on a surface that contacts the sterile cover for providing a space between the mouse and the cover to reduce friction between the sterile mouse and sterile cover caused by bodily fluids.

At least one display device is provided for displaying at least one of (a) a patient parameter monitoring program, (b) a medical device control program, (c) a medicament distribution program, (d) an image processing program and (e) a patient record annotation program. The at least one display one display is a composite display and includes a plurality of user-definable display areas for displaying a plurality of different display images. The sensor pad includes at least one user-selectable button enabling the user to actively switch control between a first healthcare computer system and a second different healthcare computer system. A selection processor is electrically coupled between the at least one user-selectable button and the at least one output enabling control of the selected healthcare computer system.

Alternatively, the system includes a single composite display device having a plurality of user-definable display areas for displaying a plurality of different display images corresponding to different healthcare computer systems. In this embodiment, the sensor pad includes a control processor for sensing the position of sterile mouse and automatically switching control between the different healthcare computer systems in response to the sensed positioned of the sterile mouse. 13. The control processor automatically associates at least one control action for controlling an actively selected healthcare computer system with the at least one control button on the mouse.

The sensor pad includes at least one user-selectable button enabling the user to actively switch control between a first healthcare computer system and a second different healthcare computer system and a selection processor is electrically coupled between the at least one user-selectable button and the at least one output enabling control of the selected healthcare computer system. The sterile cover includes an aperture enabling access to the at least one user selectable button. Additionally, a sterile keyboard is provided on the sensor pad and the sterile cover includes an aperture corresponding to the sterile keyboard enabling user access to the sterile keyboard.

The control system described above and with respect to FIGS. 1-8 is able to operate healthcare computer system including at least one of (a) an x-ray imaging system, (d) a magnetic resonance imaging (MRI) system, (c) medicament distribution system, (d) an electrogram recording system, (e) an RF Ablation system, (f) an intra-cardiac ultrasound system, (g) a 3D mapping system, (h) a clinical information system and (i) a patient record system. Further, the control system is at least one of (a) mounted within a sterile field used during an interventional procedure and (b) mounted to display device mounting apparatus.

The system and processes of FIGS. 1-8 are not exclusive. Other systems, processes and menus may be derived in accordance with the principles of the invention to accomplish the same objectives. Although this invention has been described with reference to particular embodiments, it is to be understood that the embodiments and variations shown and described herein are for illustration purposes only. Modifications to the current design may be implemented by those skilled in the art, without departing from the scope of the invention. Further, the processes and applications may, in alternative embodiments, be located on one or more (e.g., distributed) processing devices on a network of a healthcare enterprise.

What is claimed is:

1. A system for controlling multiple computerized medical devices comprising:
    a passive sterile mouse;
    an active mouse-sensing base for sensing a position of said passive sterile mouse and generating a control signal for controlling at least one computerized medical device;
    a removable sterile mouse pad selectively positioned over said active mouse sensing base for sealing said active mouse-sensing base thereunder, said mouse pad being detachably removable from said mouse-sensing base after use, enabling replacement of a non-sterile mouse pad with a sterile mouse pad and re-packaging of the replacement sterile mouse pad with said mouse-sensing base; and
    a selection processor coupled to said active mouse-sensing base for receiving said control signal and providing said control signal to said at least one computerized medical device enabling control of said at least one computerized medical device, within a sterile field during an interventional procedure.

2. The system of claim 1, wherein
    the replacement sterile mouse pad is at least one of, (a) a sterilized non-sterile mouse pad and (b) a new sterile mouse pad and
    said passive sterile mouse includes a resonant circuit selectively activated by a magnetic field generated by said active mouse-sensing base.

3. The system of claim 1, wherein
    said active mouse-sensing base includes a plurality of control buttons coupled to said selection processor for selecting a particular computerized medical device to be controlled by said passive sterile mouse and
    said mouse pad shape substantially conforms to a shape of said mouse-sensing base.

4. The system of claim 1, further comprising
    at least one display device for displaying an image corresponding to a particular computerized medical device being controlled by said passive sterile mouse.

5. The system of claim 1, wherein
    said passive sterile mouse includes at least one control button, and
    said active mouse-sensing base senses a position of said passive sterile mouse and automatically assigns at least one control function associated with a particular computerized medical device to said at least one control button.

6. A system for controlling a healthcare information technology system in a sterile environment comprising:
    a sterile mouse including at least one user activated control button and including a resonant circuit sealed therein;
    a sensor pad including circuitry for generating a magnetic field and activating said resonant circuit in said sterile mouse to sense a position of said sterile mouse and including at least one output port for selectively enabling control of at least one healthcare computer system using said sterile mouse; and
    a removable sterile cover selectively positioned over said sensor pad for sealing said sensor pad under said sterile cover, said sterile cover enabling natural movement of said sterile mouse by a user for controlling said at least one healthcare computer system, said sterile cover being detachably removable from said sensor pad after use, enabling replacement of a non-sterile cover with a replacement sterile cover and re-packaging of said replacement sterile cover with said sensor pad.

7. The system of claim 6, wherein
    the replacement sterile cover is at least one of, (a) a sterilized non-sterile cover and (b) a new sterile cover,
    said sterile cover shape substantially conforms to a shape of said sensing pad and
    said sterile mouse includes at least one lift positioned on a surface that contacts said sterile cover for providing a space between said sterile mouse and said cover to reduce friction between said sterile mouse and sterile cover caused by bodily fluids.

8. The system of claim 6, further comprising
    at least one display device for displaying at least one of (a) a patient parameter monitoring program, (b) a medical device control program, (c) a medicament distribution program, (d) an image processing program and (e) a patient record annotation program.

9. The system of claim 8, wherein
    said at least one display is a composite display including a plurality of user-definable display areas for displaying a plurality of different display images.

10. The system of claim 8, wherein
    said sensor pad includes at least one user-selectable button enabling the user to actively switch control between a first healthcare computer system and a second different healthcare computer system, and
    a selection processor electrically coupled between said at least one user-selectable button and said at least one output enabling control of said selected healthcare computer system.

11. The system of claim 6, further comprising
a composite display device having a plurality of user-definable display areas for displaying a plurality of different display images corresponding different healthcare computer systems, and
wherein said sensor pad includes a control processor for sensing said position of sterile mouse and automatically switching control between said different healthcare computer systems in response to said sensed positioned of said sterile mouse.

12. The system of claim 11, wherein
said control processor automatically associates at least one control action for controlling an actively selected healthcare computer system with said at least one control button on said mouse.

13. The system of claim 6, further comprising
a sterile keyboard connected to said sensor pad.

14. The system of claim 6, wherein
said sensor pad includes at least one user-selectable button enabling the user to actively switch control between a first healthcare computer system and a second different healthcare computer system, and
a selection processor electrically coupled between said at least one user-selectable button and said at least one output enabling control of said selected healthcare computer system.

15. The system of claim 14, wherein
said sterile cover includes an aperture enabling access to said at least one user-selectable button.

16. The system of claim 6, wherein
said healthcare computer system is at least one of (a) an x-ray imaging system, (b) a magnetic resonance imaging (MRI) system, (c) medicament distribution system, (d) an electrogram recording system, (e) an RF Ablation system, (f) an intra-cardiac ultrasound system, (g) a 3D mapping system, (h) a clinical information system and (i) a patient record system.

17. The system of claim 6, wherein
said system is at least one of (a) mounted within a sterile field used during an interventional procedure and (b) mounted to a display device mounting apparatus.

18. A system for controlling a healthcare information technology system in a sterile environment comprising:
a sterile mouse including at least one user activated control button and including a resonant circuit sealed therein;
a sensor pad including circuitry for generating a magnetic field and activating said resonant circuit in said sterile mouse to sense a position of said sterile mouse and including at least one output port for selectively enabling control of at least one healthcare computer system using said sterile mouse;
a sterile drape for covering said sensor pad; and
a sterile cover selectively positioned over said sensor pad for sealing said sensor pad under said sterile cover, said sterile cover enabling natural movement of said sterile mouse by a user for controlling said at least one healthcare computer system wherein said sterile cover is removably positioned over said sterile drape and sensor pad.

19. A method of controlling a computerized medical device in a sterile field comprising the activities of:
providing a passive sterile mouse and removable sterile mouse pad;
providing an active mouse-sensing base that is connected to a selection processor that enables a physician to directly control multiple computerized medical devices;
covering the active mouse-sensing base with said removable sterile mouse pad to seal said active mouse-sensing base from contact with a fluid, said mouse pad being detachably removable from said mouse-sensing base after use, enabling replacement of a non-sterile mouse pad with a sterile mouse pad and re-packaging of the replacement sterile mouse pad with said mouse-sensing base; and
manipulating the passive sterile mouse about said sterile mouse pad to control a particular one of the multiple computerized medical devices.

20. The method of claim 19, wherein
the replacement sterile mouse pad is at least one of, (a) a sterilized non-sterile mouse pad and (b) a new sterile mouse pad and
said mouse pad shape substantially conforms to a shape of said mouse-sensing base.

21. The method of claim 19, further comprising the activity of
switching automatically between controlling a first computerized medical device and a second different computerized medical device in response to a sensed change in position of the passive sterile mouse.

22. The system of claim 21, wherein
said mouse sensing-base includes a plurality of control buttons coupled to said multiplexer for selecting a particular computerized medical device to be controlled by said passive sterile mouse.

* * * * *